(12) United States Patent
Susan

(10) Patent No.: US 9,674,070 B2
(45) Date of Patent: Jun. 6, 2017

(54) METHOD AND APPARATUS FOR DETECTING A SET UP SIGNAL USED FOR DATA COMMUNICATION OVER A COMMUNICATION NETWORK

(71) Applicant: Adrian Susan, Orastie (RO)

(72) Inventor: Adrian Susan, Orastie (RO)

(73) Assignee: NXP USA, INC., Austin, TX (US)

( * ) Notice: Subject to any disclaimer, the term of this patent is extended or adjusted under 35 U.S.C. 154(b) by 226 days.

(21) Appl. No.: 14/594,522

(22) Filed: Jan. 12, 2015

(65) Prior Publication Data
US 2015/0139011 A1    May 21, 2015

Related U.S. Application Data

(62) Division of application No. 12/988,832, filed as application No. PCT/IB2008/051961 on May 19, 2008, now Pat. No. 8,934,582.

(51) Int. Cl.
| H04L 12/26 | (2006.01) |
| H04Q 1/457 | (2006.01) |
| H04L 7/04 | (2006.01) |

(52) U.S. Cl.
CPC .............. *H04L 43/50* (2013.01); *H04L 7/046* (2013.01); *H04Q 1/457* (2013.01)

(58) Field of Classification Search
CPC .......... H04L 43/50; H04L 7/046; H04Q 1/457
USPC ....................................................... 370/252
See application file for complete search history.

(56) References Cited

U.S. PATENT DOCUMENTS

| 4,259,548 A * | 3/1981 | Fahey ................... H04M 11/04 340/506 |
| 5,590,650 A | 1/1997 | Genova |
| 6,687,368 B1 | 2/2004 | Aoyagi et al. |
| 2002/0076034 A1 | 6/2002 | Prabhu et al. |
| 2002/0164002 A1 * | 11/2002 | Beadle .................. H04L 5/1438 379/93.01 |
| 2003/0090738 A1 * | 5/2003 | Ananthaiyer .......... H04N 1/001 358/405 |

(Continued)

FOREIGN PATENT DOCUMENTS

WO          97/15989 A      5/1997

OTHER PUBLICATIONS

International Search Report mailed Jul. 8, 2009 for corresponding International Application No. PCT/IB2008/051961, 5 pages.

*Primary Examiner* — Stephen J Clawson

(57) ABSTRACT

A method of detecting a set up signal having a predetermined frequency and used for data transmissions over a communication network comprises comparing an energy level of a filtered received signal with a first predetermined value and providing a first detect signal, comparing an energy level of a component of the received signal at a predetermined frequency with a second predetermined value and providing a second detect signal. In addition, an autocorrelation function is performed on the received signal to discriminate between the set up signal and other signals in the received signal and a check signal is provided when the autocorrelation function identifies the set up signal. The set up signal in the received signal is detected in response to the first and the second detect signals and the check signal. A method of detecting phase reversals in the set up signal is also disclosed.

20 Claims, 5 Drawing Sheets

(56) References Cited

U.S. PATENT DOCUMENTS

2005/0105716 A1    5/2005   Das et al.
2006/0227764 A1   10/2006   Miriyala et al.
2008/0212563 A1    9/2008   Birru
2009/0041202 A1    2/2009   McNeill et al.

* cited by examiner

METHOD AND APPARATUS FOR DETECTING A SET UP SIGNAL USED FOR DATA COMMUNICATION OVER A COMMUNICATION NETWORK

CROSS-REFERENCE TO RELATED APPLICATIONS

This application is a divisional of U.S. patent application Ser. No. 12/988,832, entitled "Method and Apparatus for Detecting a Set Up Signal Used for Data Communication Over a Communication Network," filed on Oct. 21, 2010, which is a National Stage Entry under 37 C.F.R. §371 of PCT/IB2008/051961, filed May 19, 2008, the disclosures of which are hereby expressly incorporated by reference in their entirety.

DESCRIPTION

Field of the Invention

This invention relates to a method and apparatus for detecting a set up signal used for data communication over a communication network and a method and apparatus for detecting phase reversals in a set up signal used for data communication over a communication network.

Background of the Invention

As the number of communication networks such as PSTN, IP networks or PBX increases and with the desire to be able to communicate between the different communication networks, a unit known as a media gateway unit has been developed that acts as a translation unit with communication (such as voice or data calls) from one communication network being connected to another communication network through the media gateway unit. The media gateway unit performs a conversion between the different transmission and coding techniques of the different communication networks. Thus, for example, a data call from a data modem in an IP network would connect to a data modem in the PSTN network through a media gateway unit and the media gateway unit converts the data signals between their state in the IP network and the state required for transmission over the PSTN network.

The media gateway unit can operate in a number of different modes depending on which networks are to be connected through the media gateway unit. For example, for a data call between an IP network and a PSTN network, the media gateway unit switches to a mode in which encoded data from the IP network is decoded and then sent to the PSTN network and vice versa. A voice connection can also be used for data transmission (e.g. between a modem, facsimile, etc.) and the data transmitted over a voice connection is known as voiceband data. The signal characteristics are however different for voice and voiceband data and transmitting them requires different approaches. The low bit-rate vocoders (e.g. G.723.1, G.729) commonly used for voice transmission in IP networks are designed and focused to handle voice signals and do not provide a reliable method for transmitting data. Several mechanisms are used to improve the reliability of the transmission of voiceband data (VBD) and one of the simplest, known as the VBD switch when the media gateway unit switches to a VBD mode, is to detect the voiceband data and to then bypass the vocoder processing. The mode of the media gateway unit is determined by signalling or set up information received at the media gateway unit such as PSTN signalling information, IP signalling information or modem or fax tones.

The switching of the media gateway unit to a mode may trigger certain events in the media gateway unit.

In communication networks supporting speech or voice communication, such as PSTN or IP, devices such as CODECs, echo suppressors and echo cancellers are used in the network to perform telephone processing functions for speech or voice signals. For example, echo cancellers are used to reduce and attempt to eliminate echoes formed when a speech signal from a user coupled to a local subscriber loop at one end traverses the PSTN to a user coupled to a local subscriber loop at another end. However, for data communication between data enabled devices (e.g. data modems), over a network which support voice communication (for example, one modem being part of a PSTN and another to an IP network), as the data signal is passed through the voice CODECs in the PSTN network, the data signal becomes distorted and the modems cannot communicate. Thus, when the media gateway unit determines from the signalling or set up information that a data call is to be made across a PSTN network, the media gateway unit switches mode to the VBD mode and on entering that mode an event is triggered to disable the voice processing devices in the PSTN network, such as the echo cancellers, so that the data signal is not distorted.

Similarly, for data communication through the media gateway unit and over an IP network, when the media gateway unit determines from the signalling or set up information that a data call is to be made across an IP network, the media gateway unit switches mode and on entering that mode an event is triggered to disable the IP vocoder which encodes the data according to the IP protocol so that uncoded data may be passed through the media gateway unit.

In order to detect that data communication has been initiated, the media gateway unit typically comprises a module which detects when a data communication has been initiated over a communication network, e.g. when a modem connects to a PSTN line and tries to communicate, and depending on the output of the module the media gateway unit is arranged to trigger certain events e.g. disable the echo cancellers and suppressors or IP vocoders. This is achieved by the module being arranged to detect a certain type of set up signal which is used to initiate data communication and which is typically known as an answer tone signal sent by the answering device. The answer tone signals ANS, ANSam are defined by ITU standards, ITU-T V.8 and ITU-T V.25, and in a basic form the answer tone signal is a single continuous tone with a frequency of 2100 Hz±15 Hz and a duration of 3.3±0.7 seconds. As described in these ITU standards, the answer tone may include 180° phase reversals at predetermined intervals, such as 425 to 475 ms, which is used by the media gateway unit to disable network echo cancellers.

U.S. Pat. No. 7,003,093 describes a tone detection processor which discriminates between tone and voice signals and determines the tones. The tone detection processor performs automatic gain control (AGC) to normalize the power of the tone or voice signal. Further, the energy of the tone or voice signals are determined at specific frequencies utilizing a Goertzel Filter process which implements a plurality of Goertzel filters. The tone detection processor determines whether or not a tone is present from the two maximum energy levels of the Goertzel filtered tone and if a tone exits, determines the type of tone. However, the tone detection method described in this patent is not very accurate since it only uses a Goertzel Filter process. This means that a high (approx 100%) Call Connect Reliability (CCR)

for all standard types of telephone lines (EIA 1-7, ETSI1 and ETSI2) is not achievable. In addition, additional processing overhead is required by the use of AGC.

There is therefore a need to provide an improved method for detecting a set up signal for data communication which addresses at least some of the above referenced problems.

SUMMARY OF THE INVENTION

The present invention provides a method and apparatus for detecting a set up signal used for data communication over a communication network as described in the accompanying claims.

Specific embodiments of the invention are set forth in the dependent claims.

These and other aspects of the disclosure will be apparent from and elucidated with reference to the embodiments described hereinafter.

BRIEF DESCRIPTION OF THE DRAWINGS

Further details, aspects and embodiments of the disclosure will be described, by way of example only, with reference to the drawings. Elements in the figures are illustrated for simplicity and clarity and have not necessarily been drawn to scale.

DETAILED DESCRIPTION OF THE DRAWINGS

The present invention will be described with reference to detecting an answer tone signal. However, it will be appreciated that the present invention is not limited to the detection of answer tone signals and may be used to detect other set up signals for data communication, including a fax tone, Call Tone (CT), V.32 AA tone and similar set up signals.

Figure 1:
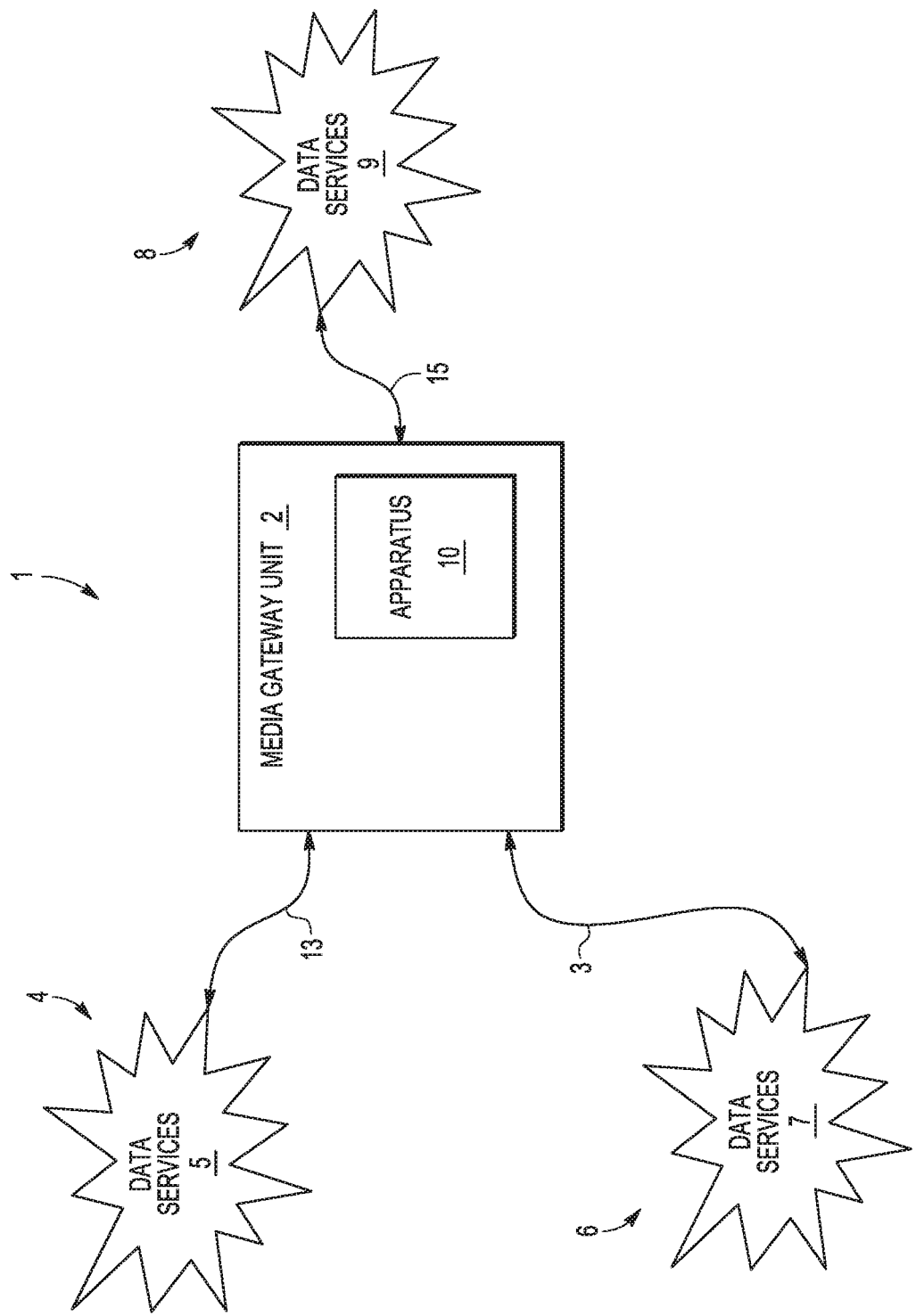
FIG. 1 is a block schematic diagram of an example of a communication system comprising a plurality of communication networks connected by a media gateway unit.

Referring firstly to FIG. 1, a communication system 1 comprises a plurality of communication networks, including for example a private branch exchange (PBX) network 4, an IP network 6 and a PSTN network 8, and a media gateway unit 2 for connecting the plurality of communication networks 4, 6, 8 and enabling communication over the different networks over communication links 3, 13 and 15. Each communication network supports data communication from data devices or data enabled devices: for the PBX network 4, the data devices 5 may include data modems, facsimile devices; for the IP network 6, the data devices 7 may include IP video phones, computers; and for the PSTN network 8, the data devices 9 may include Digital Subscriber Line (DSL) modems or facsimile devices, ATMs. The data communicated over the networks 4, 6, 8 may include video, voice, SMS, email, multimedia or other types of data.

The media gateway unit 2 typically comprises a media gateway controller (not shown) and an apparatus 10 for detecting an answer tone signal in accordance with an embodiment of the disclosure. The apparatus 10 may be part of the media gateway controller or separate to the media gateway controller. Although the apparatus 10 will be described as being part of the media gateway unit 2, it will be appreciate that the apparatus 10 may, additionally or alternatively, be part of a data device in a network. In the case when the apparatus 10 is part of a data device, it may be used to detect an answer tone signal from another data device in the same or different communication networks so that data communication can be set up between the two data devices.

Figure 2:
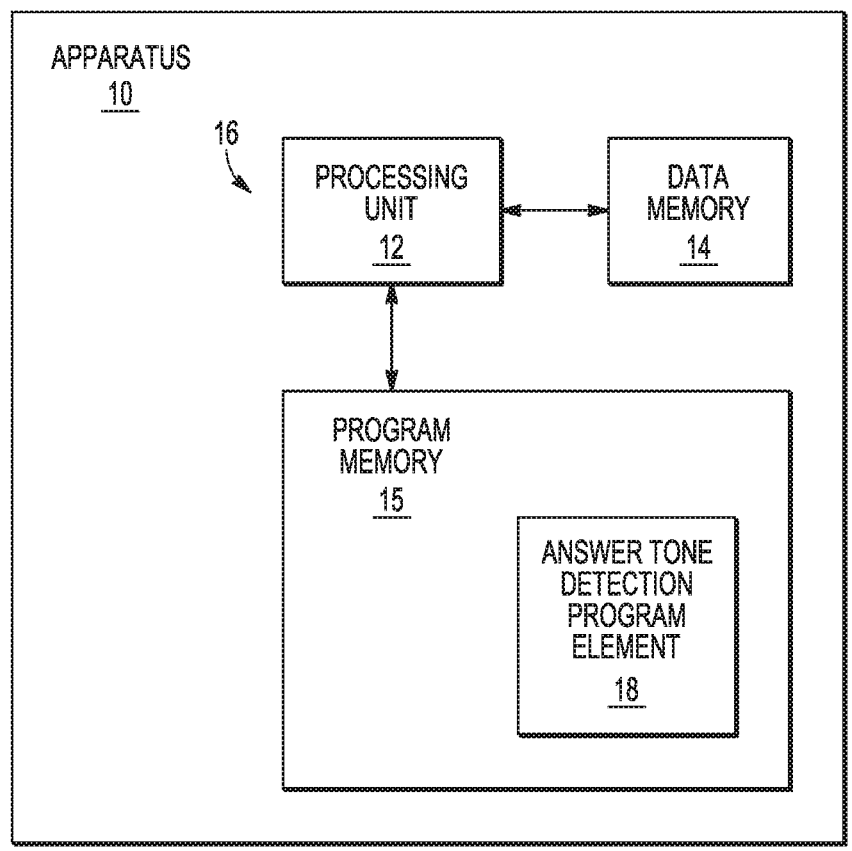
FIG. 2 is a block schematic diagram of an example of an apparatus for detecting an answer tone signal used for data communication over a communication network in accordance with an embodiment of the disclosure.

In an embodiment shown in FIG. 2, the apparatus 10 comprises a processing unit 12, data memory 14 and program memory 15. The processing unit 12 may be a single processor, such as the StarCore DSP device supplied by Freescale Semiconductor, Inc. or may comprise two or more processors. The number of processors and the allocation of processing functions to the processors is a matter of design choice for a skilled person. The program memory 15 of the apparatus 10 stores programs containing processor instructions for operation of the processing unit 12. The programs may contain a number of different program elements or sub-routines containing processor instructions for a variety of different tasks. Specific program elements stored in program memory 15 include an answer tone detection program element 18. More details of the operation of this answer tone detection program element 18 will be described below.

To illustrate the operation of the communication system 1, lets consider the situation when a data modem in the IP network 6 connects to a data modem in the PSTN network 8 to exchange data, with the data modem 7 in the IP network 6 being the originator of the data exchange and the data modem 9 in the PSTN network 8 being the terminator of the data exchange. The communication path is routed through the media gateway unit 2. The initial transmission sequence consists of the originator modem 7 sending a set up signal named Call Tone signal CT, and the terminator modem 9 detecting this set up signal and responding with a set up signal named answer tone signal ANS. Usually, the signals transmitted over the IP network 6 are coded using low-bit vocoders. The media gateway unit 2 receives the signals from the IP network 6 and decodes them according to the vocoder type into a linear (uncoded) format. The signals received from PSTN network 8 that are to be sent to the IP network 6 will be first encoded by the media gateway unit 2 using one of the above mentioned low-bit vocoders and sent to the IP network 6 in a coded format. When an answer tone signal ANS is generated by the terminator modem 9, the apparatus 10, by means of the answering tone detection program element 18, notifies the media gateway unit 2 that the connected party from the PSTN network 8 generated an answer tone signal ANS and thus identifies it as being a terminator modem 9. The media gateway unit 2 will then suppress encoding the signal and send it from now on in a linear (uncoded) format. If the answer tone signal ANS continues with phase reversal(s), the apparatus 10 is arranged to detect the phase reversal(s) and will notify the media gateway unit 2 to disable its built-in echo canceller (not shown).

A method for detecting a set up signal in accordance with an embodiment of the disclosure will now be described with further reference to FIG. 3. In an embodiment, the set up signal is the answer tone signal and has a predetermined frequency of 2100 Hz.

The processing unit 12 of apparatus 10 receives a signal at an input 6, at block 30 and processes the received signal according to the answer tone detection program element 18. The received signal is in a linear format following decoding in the media gateway unit 2. In an embodiment, the received signal includes a 16 bit linear data word sampled at 8 kHz and the processing unit 12 processes the received signal in 10 ms frames: that is, the received signal comprises a plurality of frames each of 10 ms duration.

Broadly, a method in accordance with an embodiment of the disclosure comprises determining an energy level of the received signal at substantially the predetermined frequency of the answer tone signal and comparing the determined energy level with a predetermined value. When the determined energy level is greater than the predetermined value, it is then determined that the set up signal has been detected in the received signal.

Figure 3:
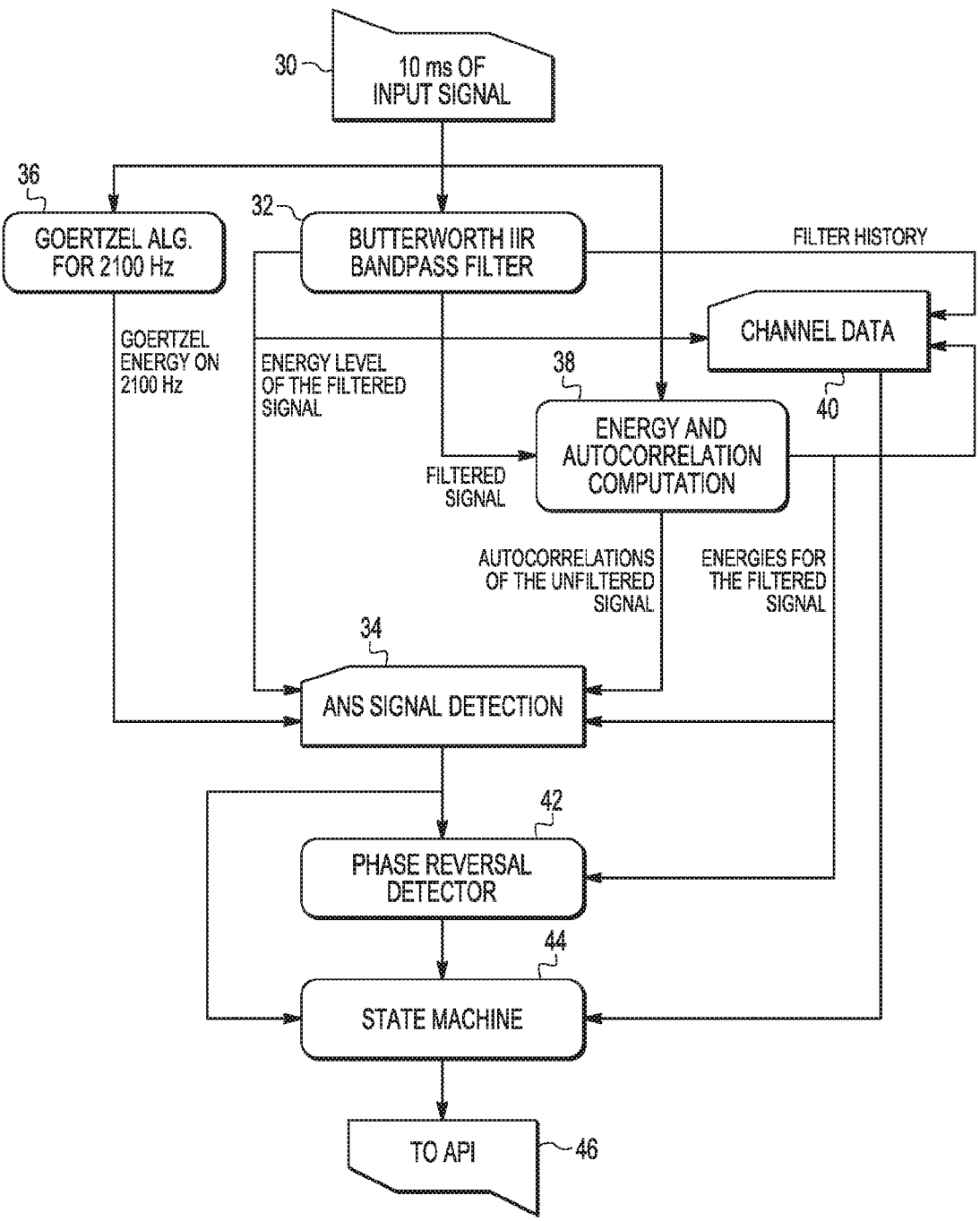
FIG. 3 is a flow chart schematically illustrating a high-level overview of an example of a method of detecting a answer tone signal used for data communication over a communication network in accordance with an embodiment of the disclosure.

In the embodiment shown in FIG. 3, two techniques are used to calculate the energy level of the received signal at the predetermined frequency: one technique uses a Butterworth filter element and the other uses a Goertzel algorithm element.

For the Butterworth filter element 32, the received signal is filtered by a Butterworth filter element having a passband including the predetermined frequency of the answer tone signal and the energy level of the filtered received signal is determined. For an answer tone signal having a frequency of 2100 Hz, the Butterworth filter may comprise a bandpass Infinite Impulse Response (IIR) Butterworth filter with Fstop1=2000 Hz, Fpass1=2070 Hz, Fpass2=2120 Hz, Fstop2=2200 Hz, Astop1=40 dB, Apass=1 dB, and Astop2=40 dB. The filter characteristics will vary according to the characteristics of the answer tone signal. The determined energy level of the filtered received signal is then processed by an answer tone signal detection element 34.

An advantage of using a Butterworth filter as opposed to other IIR filters is that the frequency response of a Butterworth filter is flat and no ripple is produced on the passband. The Butterworth type filter was first described by the British engineer Stephen Butterworth in his paper "On the Theory of Filter Amplifiers", Wireless Engineer, vol. 7, 1930, pp. 536-541. Digital implementations of Butterworth filters often use bilinear transform or matched z-transform to discretize an analog filter. For higher orders, they are sensitive to quantization errors. For this reason, they are often calculated as cascaded biquad sections and a cascaded first order filter, for odd orders. Butterworth filters are well known in the art and so no further details on such a filter shall be provided herein.

The energy of the Butterworth filtered signal is computed using the following formula:

$$E_{filtered} = \sum_{i=0}^{N-1} x_f^2(i) \qquad \text{Formula 1}$$

where: N represents the number of samples in a frame (i.e. 80 samples); and $x_f(0 \ldots N-1)$ represents the filtered samples from the above mentioned frame.

The received signal is also processed according to a Goertzel algorithm element 36 operating on the predetermined frequency of 2100 Hz so that a component of the received signal at the predetermined frequency is identified and then the energy level of the identified component is determined. The determined energy level of the identified component is then processed by an answer tone signal detection element 34. The Goertzel algorithm was published by Dr. Gerald Goertzel in his paper "An Algorithm for the Evaluation of Finite Trigonometric Series", American Mathematical Monthly, Vol. 65, January 1958, pp. 34-35. The Goertzel algorithm is a well known technique in digital signal processing so no further details on such an algorithm shall be provided herein. For more information, see U.S. Pat. No. 7,003,093 discussed briefly above.

As an alternative to using the Goertzel algorithm element 36, a Fast Fourier Transform FFT element may be used to identify a component of the received signal at the predetermined frequency and the energy of the component identified by the FFT would then be determined. FFTs for identifying frequency components of a signal are well known. An advantage of using the Goertzel algorithm for identifying the answer tone signal at 2100 Hz is that it is faster at identifying a single frequency component compared to a FFT algorithm.

The filtered received signal and the received signal is also passed to an autocorrelation element which performs an autocorrelation function on the received signal to discriminate between the answer tone signal and other signals in the received signal. A check signal is provided to the answer tone signal detection element 34 when the autocorrelation element 38 identifies the answer tone signal.

Element 38 is also arranged to calculate the energy level of the filtered received signal over certain portions of a frame and the calculated energy levels of the filtered received signal are stored in the data memory 14 as channel data, element 40. This stored data is used for the detection of phase reversal in an answer tone signal. This will be described in more detail below.

The autocorrelation result is computed using the following formula:

$$R(\tau) = \sum_{\frac{N}{2}}^{N-1} x(i) \cdot x(i - \tau) \qquad \text{Formula 2}$$

where: N represents the number of samples in a frame (i.e. 80 samples);

$x(0 \ldots N-1)$ represents the unfiltered samples from the above mentioned frame; and $\tau$ represents the autocorrelation lag.

In an embodiment, autocorrelation is computed at element 38 on every frame for 12 different lags (i.e. from $\tau=0$ to 11). The element 64 (see FIG. 4) analyses the values $R(0) \ldots R(11)$ by first computing:

$$\text{the zero crossing rate} - ZCR = \sum_{i=1}^{11} sg[R(i) \cdot R(i-1)]$$

where

-continued $$sg(x) = \begin{cases} 1; & x < 0 \\ 0; & x \geq 0 \end{cases}$$

maximum absolute values for elements R(2) . . . R(6)–
$m_1$=max(|R(i)|), for i=$\overline{2;6}$ maximum absolute values for elements R(7) . . . R(10)–
$m_2$=max(|R(i)|), for i=$\overline{7;10}$ The element 64 is used to discriminate between ANS signal and other types of signals (e.g. noise, speech, etc.); a check signal is provided if ZCR≥3, m1≥0.62*R(0) and m2≥0.52*R(0) thus indicating that the autocorrelation values are correct (i.e. the current frame contains a frequency component in the range of the ANS signal frequency). Autocorrelation and energy calculation techniques are well known in the art and so no further details on such a techniques shall be provided herein.

The output of the answer tone signal detection element 34 is provided to a phase reversal detector element 42 and to a state machine 44. An output of the phase reversal detector element 42 is provided to the state machine 44. The state machine 44 uses all the information provided by the elements 34, 42 and the data memory 14, and processes the information and then sends event triggers to an Application Programming Interface (API) 46, if necessary according to the results of the processing. The media gateway unit 2, responds to the event triggers for example by switching modes (e.g. to the VBD mode), or by disabling its internal echo cancellers (not shown).

Figure 4:
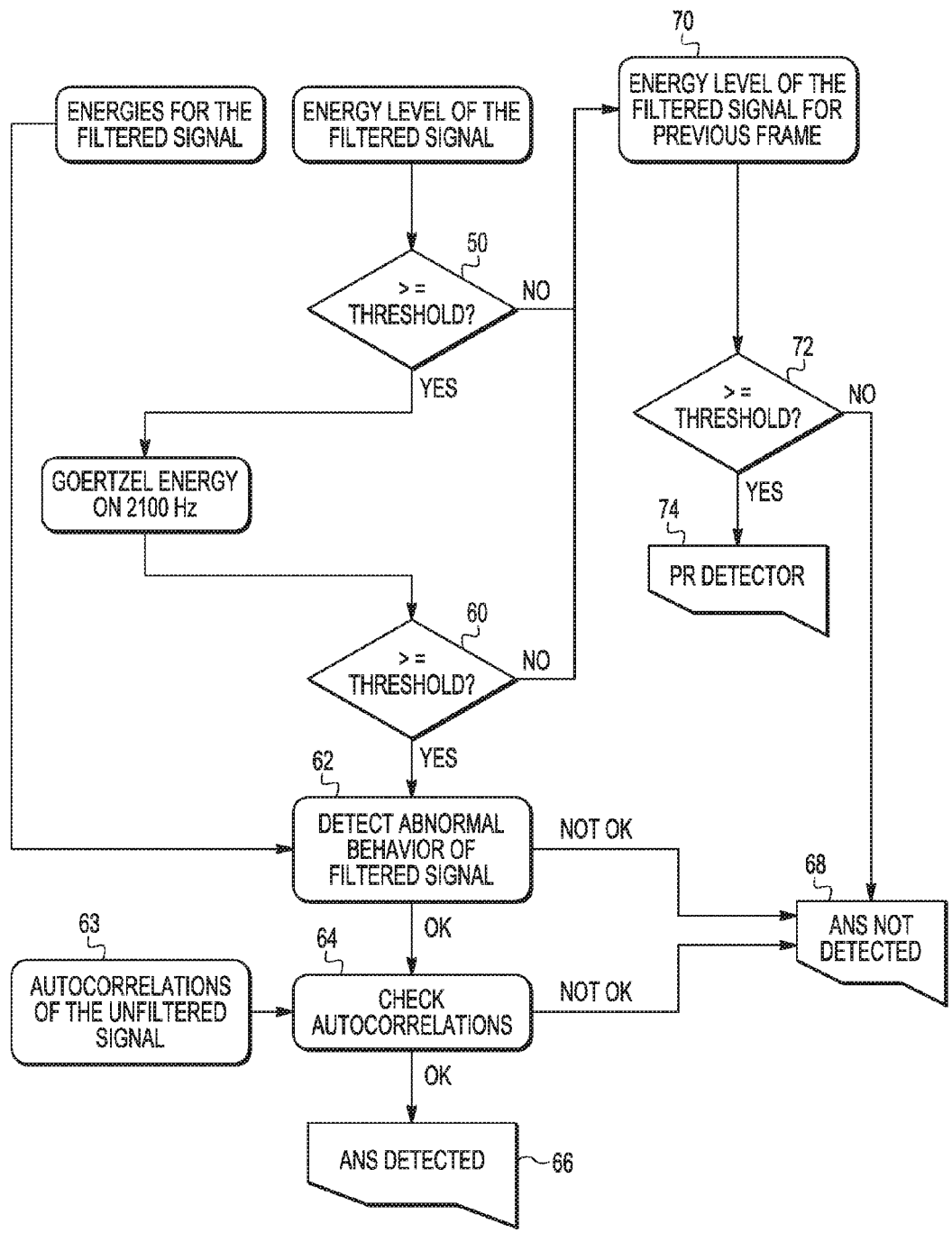
FIG. 4 is a flow chart schematically illustrating in more detail the answer tone signal detection element of the method of FIG. 3.

Referring now to FIG. 4 which shows the answer tone signal detection element 34 of FIG. 3 in more detail.

The answer tone signal detection element 34 in accordance with an embodiment of the disclosure detects the answer tone signal in the received signal taking into account the following parameters:

1) The energy level of the Butterworth filtered signal provided by element 32;

2) The energy level of a component of the received signal at 2100 Hz computed using the Goertzel algorithm by element 36; and 3) The autocorrelations (R(0)-R(11)) computed by the autocorrelation element 38 using the unfiltered signal and which discriminate between the answer tone signal and other signals.

4) The energy level of the filtered received signal over certain portions of a frame provided by element 38.

The energy levels determined by the Butterworth filter element 32 and the Goertzel algorithm element 36 are compared to predetermined values at blocks 50 and 60, respectively. For each of the comparisons at blocks 50 and 60, if the energy level is greater than or equal to the respective predetermined value, a detect signal (YES) is generated and if the energy level is less than the respective predetermined value, a non detect signal (NO) is generated. The predetermined values for blocks 50 and 60 are chosen so that the apparatus 10 will detect the answer tone signal transmitted over certain telephone lines in the PSTN network and these values will be loaded into the data memory 14 at initial programming of the apparatus 10. The values are chosen to take account of the longest line that produces the highest attenuation and so will provide the answer tone signal with the lowest energy value. Typically, the predetermined values used at blocks 50 and 60 will be in the same range.

In the event that a detect signal (YES) is generated at both blocks 50 and 60, the method for detecting the answer tone signal in accordance with an embodiment then determines whether there is abnormal behaviour, for example signal interruption, of the filtered received signal at block 62. If no abnormal behaviour is detected, then the result (block 63) of the autocorrelation function on the unfiltered signal performed by element 38 is checked at block 64. If the autocorrelation function has identified the answer tone signal, block 64 determines that the autocorrelations are correct (i.e. the current frame contains a frequency component in the range of the ANS signal frequency) and a check signal is provided at block 64. An indication that the answer tone signal has been detected is then provided at block 66. Thus, the provision of the detect signals at blocks 50 and 60 and the check signal at block 64 determine that the answer tone signal has been detected. If either block 62 indicates abnormal behaviour of the filtered signal or block 64 indicates the autocorrelations are not correct, then an indication that the answer tone signal has not been detected is provided at block 68. The outputs of blocks 66 and 68 are passed to elements 42 and 44 in FIG. 3 and used to determine what events are triggered in the media gateway unit 2.

The method in accordance with an embodiment of the invention thus uses both time domain and frequency domain techniques in order to detect an answer tone signal. The Butterworth filter and Goertzel algorithm elements are used to determine that there is an answer tone signal by comparing the calculated energies of the received signal at the predetermined frequency of the answer tone signal with predetermined values. If there is a match, the detect signal is generated and there is an indication that the answer tone signal has been detected. However, since each frame of the received signal is 10 ms and the processing unit 12 processes the received signal on a frame by frame basis, with some types of received signal (such as white noise), the signal can be considered as a stationary signal and so when processed according to the Butterworth filter and Goertzel algorithm elements a false detection of an answer tone signal may be provided. However, by also performing an autocorrelation function on the unfiltered received signal which gives a measure of how similar the received signal is with itself, the autocorrelation function can determine periodical signals and thus can be used to discriminate between a periodic signal, such as the answer tone signal, or non-periodic noise. Thus, the method in accordance with an embodiment of the present invention can ensure a high CCR. In fact, a CCR of 100% has been achieved when testing the method for many different telephone lines.

It is to be noted that the Butterworth filter element 32, the Goertzel algorithm element 36 and the autocorrelation element 38 can be performed or executed in any order or if permitted by the processing unit 12, in parallel.

If the non detect signals (NO) are provided at blocks 50 and 60, then in an embodiment, the process flow moves to block 70 at which step the energy level of the filtered received signal for a previous frame is obtained from the data memory 14 and compared to a predetermined value at block 72. If the energy level of the previous frame is greater than or equal to the predetermined value, then the process flow moves to the detection of phase reversal in the received signal by the phase reversal detector element 42, at block 74. If the energy level of the previous frame is less the predetermined value, then an indication that the answer tone signal has not been detected is provided at step 68.

In certain situations, it is possible that when an answer tone signal includes phase reversals, the energy of the received signal and filtered signal over a frame may drop so dramatically that the energy levels determined by the Butterworth filter element 32 and the Goertzel algorithm element 36 may not be greater than the predetermined values with the result that a non detect signal (NO) is generated at block 50 or block 60. By looking at the energy level of the filtered received signal for the previous frame and comparing with a predetermined value at blocks 70 and 72, the method in accordance with the embodiment shown in FIG. 4, can see whether this situation may have arisen. A 'YES' at the output of block 72 indicates that it is likely and by performing a phase reversal detection, it can then be determined whether the received signal includes phase reversal or not. If phase reversal is detected, then an answer tone signal is detected even though the non detect signal has been generated at blocks 50 and 60. The predetermined value used at block 72 is chosen in the same way as the predetermined values for the blocks 50 and 60.

The following additional parameter is used by the phase reversal detector element 42 to detect phase reversal in the detected answer tone signal.

1) The energy level of the filtered received signal determined over different sets of consecutive portions of the frames of the filtered received signal.

Phase reversal translates into a signal discontinuity so the energy corresponding to its frequency is spread in the spectrum. This signal passed through the Butterworth filter element 32 will cause the energy that was spread in the spectrum to be lost: in the time domain, this translates to a dramatic drop in the calculated energy level. This behaviour is used by the method in accordance with an embodiment of the disclosure to detect phase reversal. Since phase reversal detection can only occur after a number of frames of an answer tone signal have been received, information from a previously received frame is used in the detection method in accordance with an embodiment of the disclosure.

The phase reversal detector element 42 determines the energy level of the filtered signal over different sets of consecutive frame portions of the filtered received signal and processes the determined energy levels to detect the predetermined phase reversals in the set up signal when the determined energy levels correspond to a predetermined pattern.

In an embodiment, the processing step comprises selecting a first set of a predetermined number of consecutive frame portions, and selecting a second set of the predetermined number of consecutive frame portions, the first set including at least one different frame portion compared to the second set, and detecting the predetermined phase reversals in the set up signal when the determined energy levels for the first and second sets are substantially different.

In an embodiment, the first set is arranged to include the frame portion at the beginning of a previous frame or at the end of the current frame and the second set is shifted by one frame portion from the beginning of the previous frame towards the current frame or from the end of the current frame towards the previous frame and the method further comprises selecting further sets of consecutive frame portions until all the frame portions of the current frame and previous frame have been included in a set.

In another embodiment, the predetermined number of consecutive frame portions includes frame portions of the current frame and the previous frame.

Figure 5:
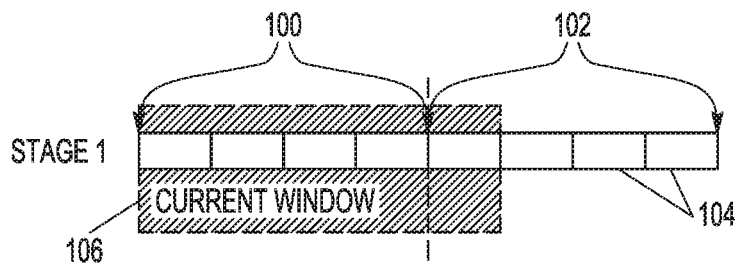
FIGS. 5-7 is a schematic representation of two frames of a received filtered signal showing the different sets of frame portions used for detecting phase reversal by the phase reversal detector element of the method of FIG. 3.
Figure 6:
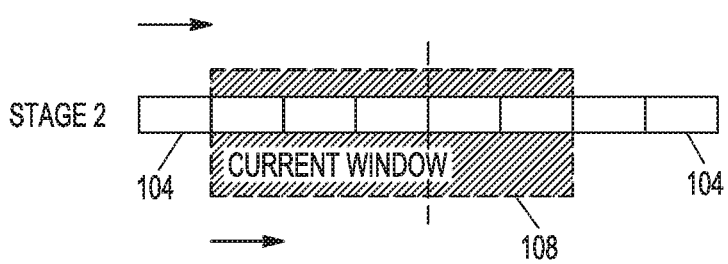
Figure 7:
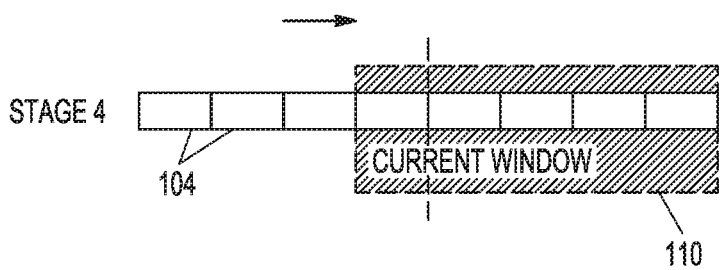

The method of detecting phase reversal can be more easily seen with reference to FIGS. 5-7 which each show two frames of a filtered received signal, a previous frame 100 and a current frame 102, at a different stage in the method. Each frame 100, 102 comprises N frame portions 104. The energy level is determined for each of the N frame portions 104 of a current frame by element 38 in FIG. 3 and for each of the N frame portions 104 of a previous frame. The energy levels for the previous frames are obtained from the channel data stored in the data memory 14. In the embodiment described herein N=4 so that the energy levels are computed every quarter of a frame of a filtered received signal (i.e. 20 samples). The energy levels for each frame portion is transformed in dBm0 (power in dBm measured at a zero transmission level point). A buffer in the processing unit 12 is used to temporarily store the eight energy levels determined for the frame portions 104 of the previous frame 100 and the current frame 102 and these energy levels are analysed to determine whether the received signal includes phase reversal or not.

A first set 106 of a predetermined number of consecutive frame portions 104 is selected and as shown in FIG. 5, the first set 106 comprises five consecutive frame portions 104 and includes all four frame portions 104 from the previous frame 100 and one frame portion 104 from the current frame 102. A second set 108 of five consecutive frame portions 104 is selected as shown in FIG. 6. The second set 108 is shifted by one frame portion 104 and includes three frame portions 104 from the previous frame 100 and two frame portions 104 from the current frame 102. A third set of five consecutive frame portions 104 is also selected in similar manner but not shown. A fourth set 112 of five consecutive frame portions 104 is selected as shown in FIG. 7 with the fourth set 110 being shifted by one frame portion 104 compared to the third set (not shown). The energy levels of each frame portion in each of the four sets 106-110 are compared with a predetermined pattern and if there is a match, then phase reversal has been detected in the answer tone signal.

Thus, the method of detecting phase reversal analyses the evolution of the determined energy levels for each of the frame portions in each set and compares every energy level in each set with the predetermined pattern to be matched. The set of five consecutive frame portions 104 can be considered a defined window which slides from the left to right to provide the first to fourth sets.

Figure 8:
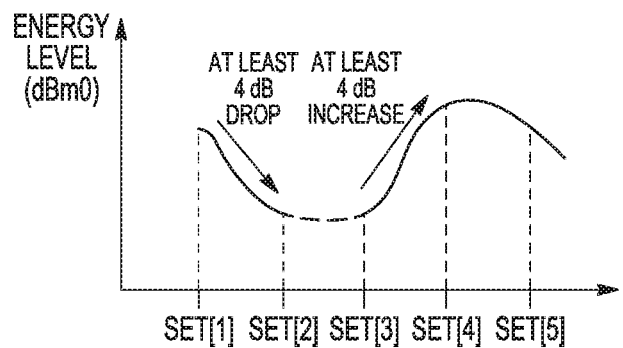
FIG. 8 is a graphical representation of a predetermined pattern which is used to detect phase reversal by the phase reversal detector element of the method of FIG. 3.

FIG. 8 shows an example of the predetermined pattern for the four sets in accordance with the embodiment described herein. The pattern is computed empirically and the values are stored in the data memory 14 on initial programming. If the analyses of the four sets 106-110 results in the pattern as indicated in FIG. 8, that is when the determined energy levels for different sets are substantially different, then it is determined that phase reversal has been detected. If the analyses of the four sets 106-110 results in a different pattern than that shown in FIG. 8, such as a constant energy level across the four sets 106-110, then phase reversal is not detected. The following additional conditions may be required to be met in order to detect phase reversal on matching to the pattern of FIG. 8: no more than 3 dB increase of set[4] compared with set[1] and set[4] or set[5] has to be greater than set[1]. These additional conditions are determined by the characteristics of the answer tone signal with phase reversal at the output of the Butterworth filter element 32. Set[5] is the value that should be compared with the fifth set (not shown).

The predetermined number of consecutive frame portions in each set is shown in FIGS. 5-7 as five. In the case described with each set comprising five frame portions 104, each set has a size of 12.5 ms (5×2.5 ms) which corresponds to the approximate duration of the phase-reversal phenomenon. Other numbers of consecutive frame portions may be used instead and the number can be determined empirically for a particular implementation. For example, when the filter element comprises a Butterworth filter, the number is linked to the Butterworth filter element. If the characteristics of the Butterworth filter element are changed, then the predetermined number of consecutive frame portions in each set may change. Filter elements other than a Butterworth filter may be used.

Different sets or a sliding window is used since the location of the phase reversal is not known.

It will be appreciated that the method of detecting phase reversals in accordance with the disclosure may be used with methods for detecting a answer tone signal other than the embodiment described above with reference to FIG. 3. For example, it may be used with the method disclosed in U.S. Pat. No. 7,003,093 and/or with filters other than the Butterworth filter element 32. It will be appreciated though that since in the embodiment described with reference to FIGS. 3-8 above, the Butterworth filter element 32 is used for both the detection of the set up signal and the detection of the phase reversals, there is a saving in the number of elements required to perform the detection of the answer tone signal and the detection of the phase reversals.

Since the method analyses the energy levels of the received signal at the predetermined frequency, the method is simple to implement and requires reduced processing cycles and memory consumption compared to the known solutions such as the detection method disclosed in U.S. Pat. No. 7,003,093 which has additional overhead due to AGC element. By improving the processing speeds (i.e. by reducing the number of processing cycles), the method in accordance with the invention provides a higher number of communication channels per core processor. This ensures that the overall DSP hardware and software solution for a media gateway unit which implements the method in accordance with the invention is more attractive from a cost and capacity perspective.

In an embodiment which uses the Butterworth filter element, the Goertzel algorithm element and the autocorrelation element to detect the set up signal, increased detection reliability can be achieved compared to the known solutions and high CCR can be achieved for all standard types of telephone lines (EIA 1-7, ETSI1, ESTI2). In addition, the method can detect set up signals at lower energy/power levels.

In an embodiment which uses the Butterworth filter element for detecting both the set up signal and phase reversal in the set up signal, such an embodiment avoids the need for separate elements and thus ensures the number of processing cycles required to detect the set up signal and phase reversals is kept to a minimum. The method of detecting the set up signal and phase reversals in accordance with an embodiment provides close to 100% CCR for all standard types of telephone lines even if the phase reversals are situated in the grey area (e.g. for phase reversals at 160°) of the standard that defines it (ITU-T V.25).

In the foregoing specification, the invention has been described with reference to specific examples of embodiments of the invention. It will, however, be evident that various modifications and changes may be made therein without departing from the broader scope of the invention as set forth in the appended claims.

It will be appreciated that, insofar as embodiments of the invention are implemented by a computer program, then a storage medium and a transmission medium carrying the computer program form aspects of the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system or processing device. The transmission medium may be a CD-rom, diskette or a data connection, such as a telephone cable or an IP connection.

The invention claimed is:

1. A method of detecting phase reversals in a set up signal used for data transmissions over a communication network, the set up signal having a predetermined frequency and including predetermined phase reversals at predetermined intervals, comprising:
    filtering a received signal by a filter having a passband including the predetermined frequency, wherein the filtered received signal comprises a plurality of frames, with each frame comprising N frame portions;
    determining the energy level of the filtered received signal over different sets of a predetermined number of consecutive frame portions of the filtered received signal;
    processing the determined energy levels; and
    detecting the predetermined phase reversals in the set up signal when the determined energy levels correspond to a predetermined pattern.

2. The method of claim 1 wherein the filter is a Butterworth filter.

3. The method of claim 1, wherein determining the energy level of the filtered received signal over different sets comprises determining the energy level for each of the frame portions of each of the different sets of consecutive frame portions.

4. The method of claim 1, wherein the processing comprises selecting a first set of a predetermined number of consecutive frame portions, and selecting a second set of the predetermined number of consecutive frame portions, the first set including at least one different frame portion compared to the second set, and detecting the predetermined phase reversals in the set up signal when the determined energy levels for the first and second sets differ by a predetermined value.

5. The method of claim 4, wherein the first set is arranged to include the frame portion at the beginning of a previous frame or at the end of the current frame and the second set is shifted by one frame portion from the beginning of the previous frame towards the current frame or from the end of the current frame towards the previous frame, and wherein the method further comprises selecting further sets of consecutive frame portions until all the frame portions of the current frame and previous frame have been included in a set.

6. The method of claim 1, wherein the predetermined number of consecutive frame portions includes at least one frame portion of the current frame and at least one frame portion of the previous frame.

7. The method of claim 1, wherein the set up signal is an answer tone signal.

8. The method of claim 1 further comprising:
    comparing the determined energy level of the filtered received signal with a first predetermined value and providing a first detect signal when the determined energy level is greater than the first predetermined value; and
    comparing the determined energy level of an identified component with a second predetermined value and providing a second detect signal when the determined energy level is greater than the second predetermined value.

9. The method of claim 8, wherein the identified component is identified using a Goertzel algorithm or a Fast Fourier Transform algorithm.

10. The method of claim 8 further comprising:
performing an autocorrelation function on the received signal to discriminate between the set up signal and other signals in the received signal and providing a check signal when the autocorrelation function identifies the set up signal; and
detecting the set up signal in the received signal in response to the first and the second detect signals and the check signal.

11. The method of claim 1, wherein the set up signal is a tone signal including the predetermined phase reversals at the predetermined intervals.

12. The method of claim 1 wherein determining the energy level of the filtered received signal over different sets comprises determining the energy level for each of the frame portions of each of the different sets of consecutive frame portions.

13. The method of claim 1 wherein processing comprises selecting a first set of a predetermined number of consecutive frame portions, and selecting a second set of the predetermined number of consecutive frame portions, the first set including at least one different frame portion compared to the second set, and detecting the predetermined phase reversals in the set up signal when the determined energy levels for the first and second sets differ by at least four (4) decibels (dB).

14. The method of claim 1 wherein the predetermined number of consecutive frame portions includes at least one frame portion of the current frame and at least one frame portion of the previous frame.

15. A method of detecting a set up signal used for data transmissions over a communication network, the set up signal having a predetermined frequency and including predetermined phase reversals at predetermined intervals, comprising:
determining an energy level of a received signal at the predetermined frequency;
comparing the determined energy level with a predetermined value and providing a detect signal when the determined energy level is greater than the predetermined value;
filtering the received signal by a filter having a passband including the predetermined frequency, wherein the filtered received signal comprises a plurality of frames, with each frame comprising N frame portions;
determining the energy level of the filtered received signal over different sets of a predetermined number of consecutive frame portions of the filtered received signal;
processing the determined energy levels;
detecting the predetermined phase reversals in the set up signal when the determined energy levels correspond to a predetermined pattern; and
detecting the set up signal in the received signal in response to the detect signal or in response to detecting the predetermined phase reversals in the set up signal.

16. The method of claim 15 wherein the filter is a Butterworth filter.

17. The method of claim 15 wherein determining the energy level of the filtered received signal over different sets comprises determining the energy level for each of the frame portions of each of the different sets of consecutive frame portions.

18. The method of claim 15 wherein the processing comprises selecting a first set of a predetermined number of consecutive frame portions, and selecting a second set of the predetermined number of consecutive frame portions, the first set including at least one different frame portion compared to the second set, and detecting the predetermined phase reversals in the set up signal when the determined energy levels for the first and second sets are substantially different.

19. The method of claim 15 wherein the predetermined number of consecutive frame portions includes at least one frame portion of the current frame and at least one frame portion of the previous frame.

20. The method of claim 15 further comprising:
performing an autocorrelation function on the received signal to discriminate between the set up signal and other signals in the received signal and providing a check signal when the autocorrelation function identifies the set up signal; and
detecting the set up signal in the received signal in response to the detect signal and the check signal.

* * * * *